(12) United States Patent
Aaron

(10) Patent No.: US 8,000,720 B2
(45) Date of Patent: Aug. 16, 2011

(54) REDUCING BANDWIDTH WHEN TRANSMITTING CONTENT TO A CELLULAR DEVICE

(75) Inventor: Jeffrey A. Aaron, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 905 days.

(21) Appl. No.: 11/955,810

(22) Filed: Dec. 13, 2007

(65) Prior Publication Data

US 2009/0156177 A1 Jun. 18, 2009

(51) Int. Cl.
*H04W 24/00* (2009.01)
*H04M 1/725* (2006.01)
*H04L 12/58* (2006.01)
*H04B 7/00* (2006.01)

(52) U.S. Cl. .................. 455/456.1; 455/412.1; 455/41.2

(58) Field of Classification Search .................. 455/41.2, 455/412.1, 456.1
See application file for complete search history.

(56) References Cited

U.S. PATENT DOCUMENTS

| | | | |
|---|---|---|---|
| 6,567,459 B1* | 5/2003 | Hakkinen et al. | 375/132 |
| 2001/0017853 A1* | 8/2001 | Kikuchi et al. | 370/335 |
| 2002/0132632 A1* | 9/2002 | Brassil et al. | 455/517 |
| 2003/0186704 A1* | 10/2003 | Tamura et al. | 455/450 |
| 2005/0143130 A1* | 6/2005 | Horneman | 455/561 |

* cited by examiner

*Primary Examiner* — Marisol Figueroa
(74) *Attorney, Agent, or Firm* — Hope Baldauff Hartman, LLC

(57) ABSTRACT

Bandwidth is reduced when transmitting content to a cellular device. Requests for a content item are received from a first cellular device and a second cellular device. The content is divided into a first portion and a second portion. A first portion plan corresponding to the first cellular device and second portion plan corresponding to the second cellular device are determined. The first portion plan may include instructions for transmitting the first portion from the first cellular device to the second cellular device and reconstructing the content item. The second portion plan may include instructions for transmitting the second portion from the second cellular device to the first cellular device and reconstructing the content item. The first portion and the first portion plan are transmitted to the first cellular device. The second portion and the second portion plan are transmitted to the second cellular device.

14 Claims, 6 Drawing Sheets

REDUCING BANDWIDTH WHEN TRANSMITTING CONTENT TO A CELLULAR DEVICE

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. QoS problems may result in unacceptable quality of service, causing customer dissatisfaction ranging from annoyance to anger.

In addition to conventional cellular services, such as voice and text messages, modern cellular devices are capable of, among other things, playing music, displaying video, and surfing the Internet. As broadband Internet access has become more pervasive at home and in the office, an increasing number of cellular customers are demanding that their cellular networks be able to provide similar speed and throughput as other broadband technologies, such as digital subscriber line ("DSL") and cable modem. In particular, cellular customers commonly use their cellular devices to access real-time and near real-time multimedia and other high bandwidth content for business (e.g., virtual meetings) and pleasure (e.g., streaming music and video).

To address the above demands of the cellular customers, cellular service providers are constantly improving their cellular networks. For example, cellular service providers may increase the channel capacity and throughput of cellular towers. However, as a general matter, an increase in the amount of data transmitted from a cellular tower to cellular devices results in one or more of the cellular tower utilizing additional power, power at an additional time, power at an additional frequency, and/or power via an additional code. As a result of the increase in power and/or added instances of power, co-interference between the communications associated with cellular devices, especially those within closer proximity (e.g., in urban and metropolitan areas), is more likely to increase.

SUMMARY

Embodiments of the disclosure presented herein include methods, systems, and computer-readable media for reducing bandwidth when transmitting content to a cellular device. According to one aspect, a method for reducing bandwidth when transmitting content to a cellular device is provided. According to the method, requests for a content item are received from a first cellular device and a second cellular device. The content is divided into a first portion and a second portion. A first portion plan corresponding to the first cellular device is determined, and a second portion plan corresponding to the second cellular device is determined. The first portion plan may include instructions for transmitting the first portion from the first cellular device to the second cellular device and reconstructing the content item upon receiving at least part of the second portion from the second cellular device. The second portion plan may include instructions for transmitting the second portion from the second cellular device to the first cellular device and reconstructing the content item upon receiving at least part of the first portion from the first cellular device. The first portion and the first portion plan are transmitted to the first cellular device. The second portion and the second portion plan are transmitted to the second cellular device.

According to another aspect, a system for reducing bandwidth when transmitting content to a cellular device is provided. The system includes a memory and a processor functionally coupled to the memory. The memory stores a program containing code for reducing bandwidth when transmitting content to the cellular device. The processor is responsive to computer-executable instructions contained in the program and operative to receive requests for a content item from a first cellular device and a second cellular device, divide the content item into a first portion and a second portion, determine a first portion plan corresponding to the first cellular device and a second portion plan corresponding to the second cellular device, transmit the first portion and the first portion plan to the first cellular device, and transmit the second portion and the second portion plan to the second cellular device. The first portion plan may include instructions for transmitting the first portion from the first cellular device to the second cellular device and reconstructing the content item upon receiving at least part of the second portion from the second cellular device. The second portion plan may include instructions for transmitting the second portion from the second cellular device to the first cellular device and reconstructing the content item upon receiving at least part of the first portion from the first cellular device.

According to yet another aspect, a computer-readable medium having instructions stored thereon for execution by a processor to perform a method for reducing bandwidth when transmitting content to a cellular device is provided. According to the method, requests for a content item are received from a first cellular device and a second cellular device. The content is divided into a first portion and a second portion. A first portion plan corresponding to the first cellular device is determined, and a second portion plan corresponding to the second cellular device is determined. The first portion plan may include instructions for transmitting the first portion from the first cellular device to the second cellular device and reconstructing the content item upon receiving at least part of the second portion from the second cellular device. The second portion plan may include instructions for transmitting the second portion from the second cellular device to the first cellular device and reconstructing the content item upon receiving at least part of the first portion from the first cellular device. The first portion and the first portion plan are transmitted to the first cellular device. The second portion and the second portion plan are transmitted to the second cellular device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
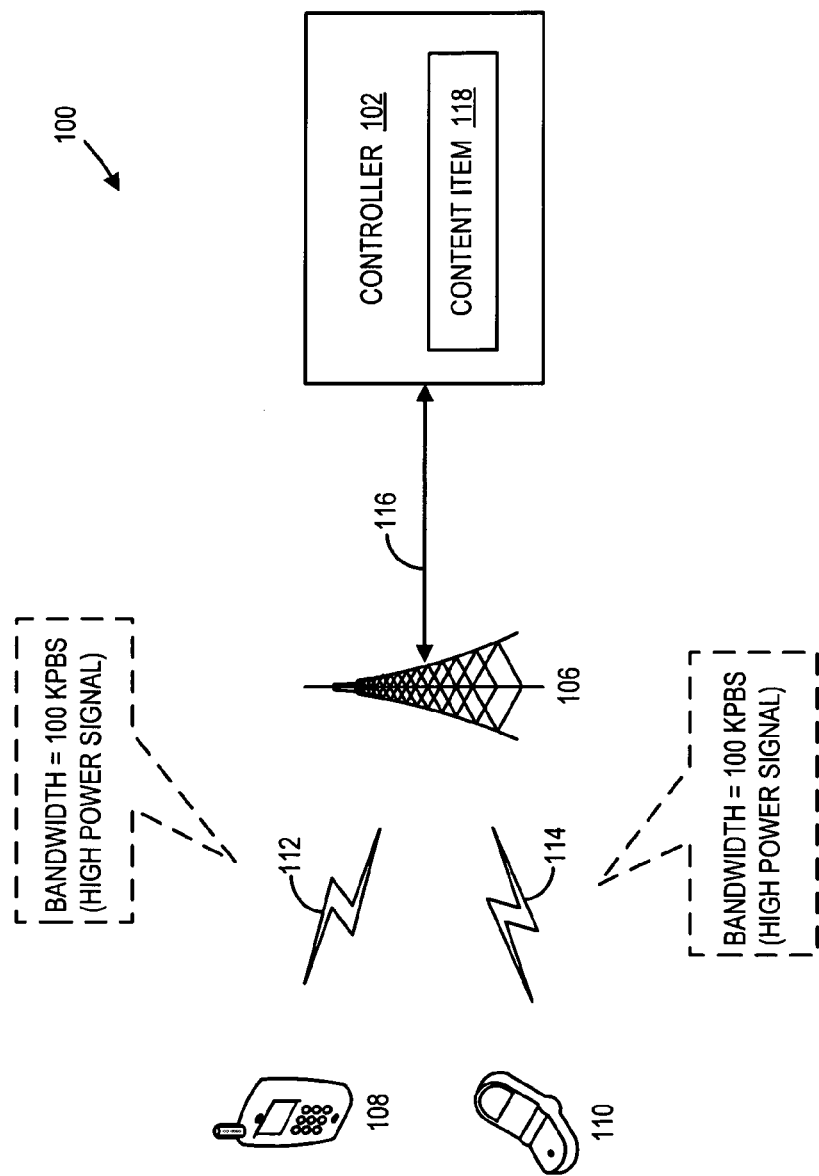
FIG. 1 is a simplified diagram illustrating a conventional cellular network configuration for transmitting high bandwidth content.

The following detailed description is directed to methods, systems, and computer-readable media for reducing bandwidth when transmitting content to a cellular device. In the following detailed description, references are made to the accompanying drawings that form a part hereof, and which are shown by way of illustration through specific embodiments or examples.

Cellular devices are now so pervasive that multiple cellular devices, each operated by a different user, may request the same content at about the same time. It is under this notion that embodiments described herein reduce bandwidth when transmitting content to a cellular device. Conventionally, when two or more cellular devices within a given proximity request the same content at about the same time, the cellular tower transmits the entire content to each cellular device. According to exemplary embodiments, the content is divided into multiple portions, and the cellular tower transmits at least one portion of the content to each cellular device. Upon receiving the portion of the content, each cellular device transmits its respective portion to the other cellular devices and receives other portions from the other cellular devices. Upon receiving two or more portions of the content, each cellular device begins reconstructing the original content based on the portions. Upon reconstructing the content, the cellular device can display or otherwise play the content as though the cellular device had received the entire content from the cellular tower.

Especially with high bandwidth content, such as streaming multimedia (e.g., text, audio, and/or video) content, that requires a substantial amount of power for transmission, the quality of service ("QoS") provided by the cellular tower may decrease as the amount of content transmitted by the cellular tower reaches near or exceeds the capacity of the cellular tower. It is generally understood that higher bandwidth content utilizes more power for transmission, while lower bandwidth content utilizes less power for transmission. It follows that by replacing higher bandwidth content with lower bandwidth content, the power utilized for transmission can be significantly reduced, thereby reducing co-interference between communications associated with the cellular devices receiving the content and improving the overall QoS. For example, high power communications transmitted by a tower to a first cellular device may interfere with the reception of communications by a second cellular device, especially when the second cellular device is relatively proximal to the communications path associated with the first cellular device and/or the source of that communication (e.g., the tower used by the first cellular device or another tower), which may be the same tower used by the second cellular device.

The embodiments described herein reduce the bandwidth and power burden on the cellular tower by delegating some of the responsibility for transmitting the content to the cellular devices. In particular, instead of utilizing high power transmissions between the cellular tower and the cellular devices for transmitting the entire content, separately to each cellular device, and thus resulting in multiple instances of high power transmissions for the same content, the embodiments described herein utilize low and medium power transmissions for transmitting portions of the content. According to an exemplary embodiment, the transmissions between the cellular devices are generally short range (e.g., within a given proximity) and may be performed via a low power peer-to-peer communication protocol. Examples of the communication protocol include, but are not limited to, Transmission Control Protocol/Internet Protocol ("TCP/IP"), WiFi, WiMax, BlueTooth, Global System for Mobile Communications ("GSM"), Code Division Multiple Access ("CDMA"), Wireless Application Protocol ("WAP"), and High-Speed Packet Access ("HSPA").

Referring now to the drawings, it is to be understood that like numerals represent like elements through the several figures, and that not all components and/or steps described and illustrated with reference to the figures are required for all embodiments. Turning now to FIG. 1, a simplified diagram illustrating a conventional cellular network configuration 100 for transmitting high bandwidth content is shown. The conventional cellular network configuration 100 includes a first cellular device 108 and a second cellular device 110. The first cellular device 108 and the second cellular device 110 communicate with a cellular tower 106 via a first wireless link 112 and a second wireless link 114, respectively. Examples of the first cellular device 108 and the second cellular device 110 include, but are not limited to, cellular phones, smartphones, personal digital assistants ("PDAs"), and the like. The cellular tower 106 is operatively coupled to a controller 102 via a backbone network 116.

As illustrated in FIG. 1, the central controller 102 includes a content item 118. For example, the content item 118 is real-time or near real-time high-bandwidth content, such as streaming multimedia content. For example, the content item 118 may be the latest episode of a popular television show, highlights from a recent sporting event, or a viral video clip from a popular video sharing website. In another example, the content item 118 may be any suitable high bandwidth content.

In an illustrative example, the first cellular device 108 and the second cellular device 110 request the content item 118 at about the same time. The time frame within the request can be considered to be about the same time may depend on, among other things, the type of content and degree of the ability of the cellular devices to buffer or store a content portion until needed, and thus to adjust separately received portions in time so as to allow for properly aligned reconstruction of the overall content, as will be described in greater detail below. To fulfill the requests from the first cellular device 108 and the second cellular device 110, the controller 102 instructs the cellular tower 106 to transmit the content item 118, in its entirety, to both the first cellular device 108 and the second cellular device 110. In one example, the content item 118 requires two hundred kilobits per second (kbps) of bandwidth total (i.e., one hundred kbps each) to transmit the content item 118 to each of the first cellular device 108 and the second cellular device 110. As illustrated in FIG. 1, one hundred kbps of bandwidth corresponds to a high power signal, which, as used herein, corresponds to a relatively high power load on the cellular tower 106. Under the conventional cellular network configuration 100, the cellular tower 106 utilizes an amount of power corresponding to two high power signals for transmitting at two hundred kbps total (i.e., one hundred kbps to the first cellular device 108 and one hundred kbps to the second cellular device 110).

Figure 2:
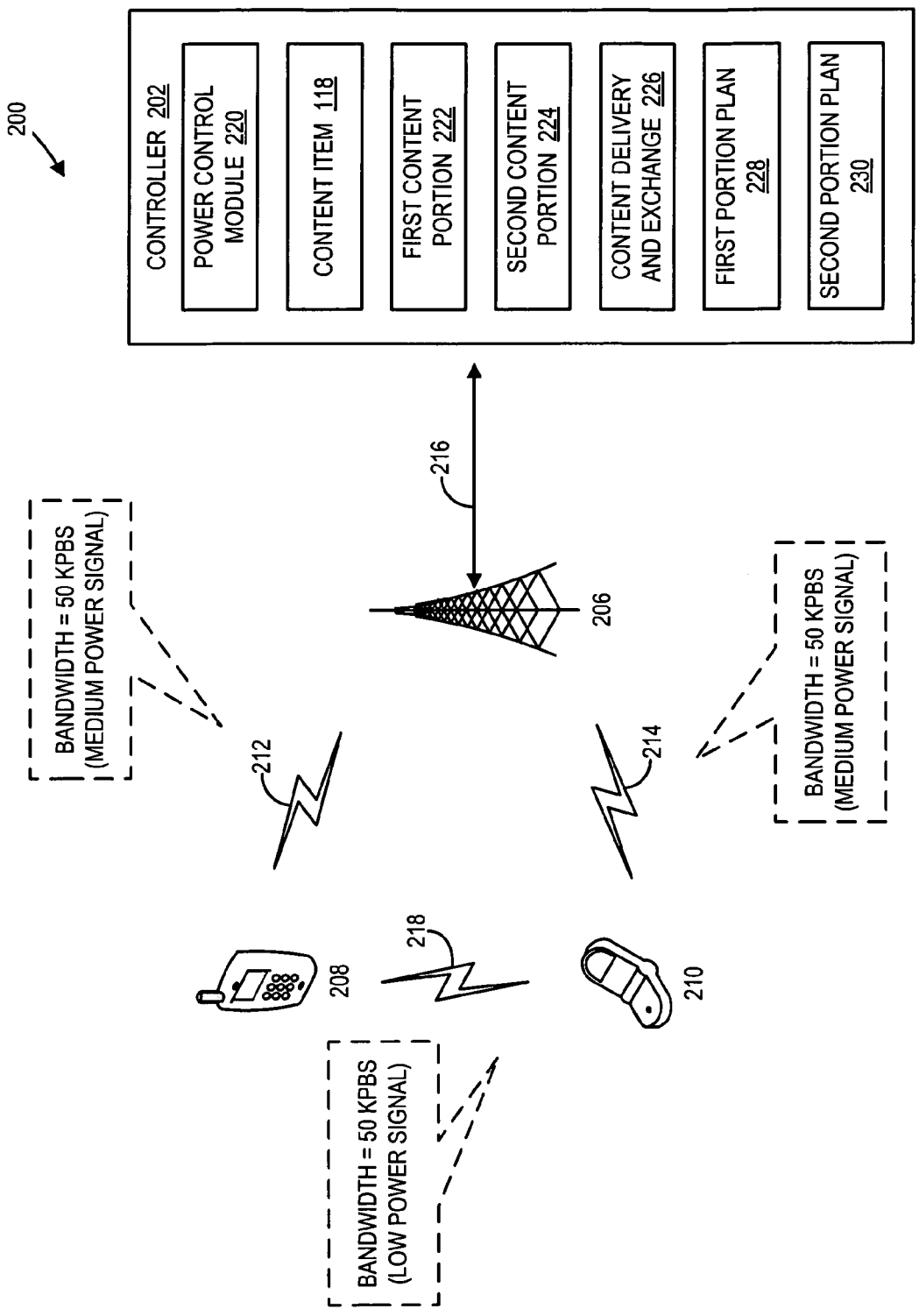
FIG. 2 is a simplified diagram illustrating a cellular network configuration for transmitting high bandwidth content, in accordance with exemplary embodiments.

Turning now to FIG. 2, a simplified diagram illustrating a cellular network configuration 200 for transmitting high bandwidth content is shown, in accordance with exemplary embodiments. As depicted in FIG. 2, the cellular network configuration 200 includes a first cellular device 208 and a second cellular device 210, similar to the first cellular device 108 and the second cellular device 110 depicted in FIG. 1. Although only two cellular devices are shown in and described with regard to FIG. 2, it should be appreciated that the methodology and topology described herein may be applicable to any number of cellular devices. The first cellular device 208 and the second cellular device 210 communicate with a cellular tower 206 via a first wireless link 212 and a second wireless link 214, respectively. The cellular tower 206 is operatively coupled to a controller 202 via a backbone network 216.

Like the controller 102 in the conventional cellular network configuration 100, the controller 202 in the cellular network configuration 200 includes the content item 118, which is requested by both the first cellular device 208 and the second cellular device 210 at about the same time. It should be appreciated that the content item 118 need not be exactly the same as that provided to the cellular devices 108 and 110. As illustrated in FIG. 2, the controller 202 further includes a power control module 220, a first content portion 222, a second content portion 224, a content delivery and exchange scheme 226, a first portion plan 228, and a second portion plan 230. The operations of the power control module 220, the first content portion 222, the second content portion 224, the content delivery and exchange scheme 226, the first portion plan 228, and the second portion plan 230 will be described in greater detail below with respect to FIGS. 2, 3, 4A, 4B, and 5.

Figure 3:
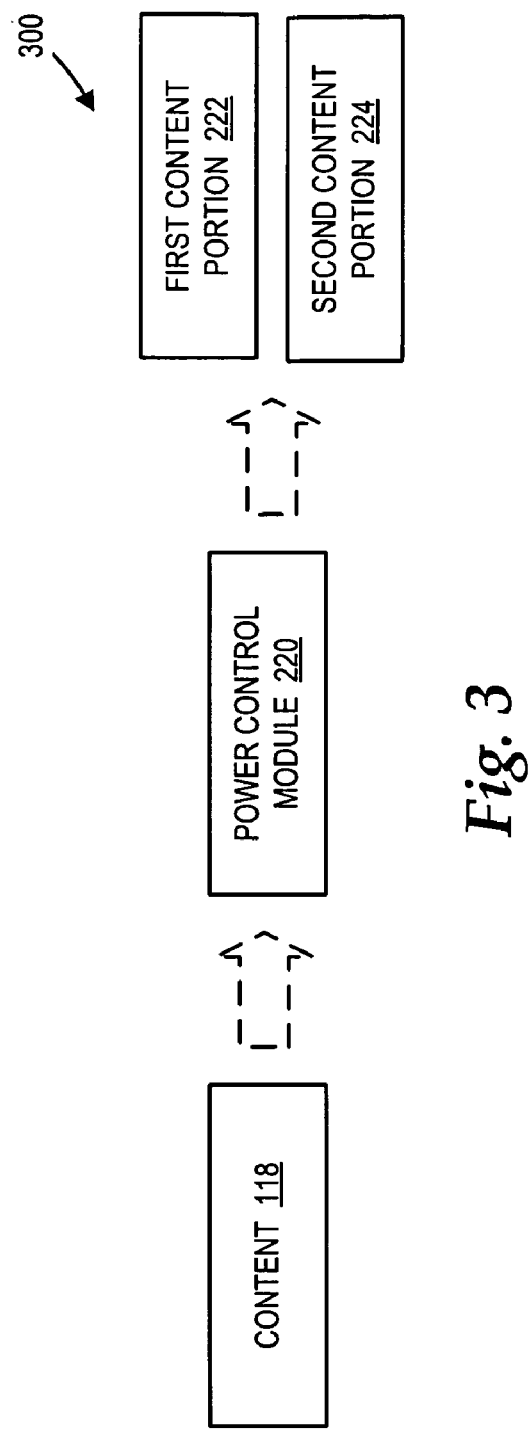
FIG. 3 is a block diagram illustrating an operation of a power control module, in accordance with exemplary embodiments.

Turning now to FIG. 3, a block diagram 300 illustrating an exemplary operation of the power control module 220 is shown. The block diagram 300 shows the power control module 220 accepting as input the content item 118. In one embodiment, the power control module 220 divides the content item 118 into a number of equally sized or near equally sized content portions corresponding to the number of cellular devices requesting the content item 118. Since two cellular devices, i.e., the first cellular device 208 and the second cellular device 210, have requested the content item 118, the power control module 220 divides the content item 118 into two content portions, i.e., the first content portion 222 and the second content portion 224.

Referring again to FIG. 2, in one embodiment, the controller 202 instructs the cellular tower 206 to transmit the first portion plan 228 to the first cellular device 208 and the second portion plan 230 to the second cellular device 210. As described in greater detail below with respect to FIG. 5, the first portion plan 228 notifies the first cellular device 208 to receive the first content portion 222 from the cellular tower 206, receive the second content portion 224 from the second cellular device 210, and transmit the first content portion 222 to the second cellular device 210. Similarly, the second portion plan 230 notifies the second cellular device 210 to receive the second content portion 224 from the cellular tower 206, receive the first content portion 222 from the first cellular device 208, and transmit the second content portion 224 to the first cellular device 210.

The portion plans 228, 230 may also contain information related to reconstructing the content item 118 based on the first content portion 222 and the second content portion 224. In further embodiments, the portion plans 228, 230 may contain any suitable information related to the transmission and utilization of the content portions 222, 224. The portion plans 228, 230 may be adjusted in response to changing conditions in the cellular network configuration 200. For example, the portion plans 228, 230 may change if the distance (i.e., proximity) between the first cellular device 208 and the second cellular device 210 exceeds an amount where a low power peer-to-peer transmission is not viable. Also as described in greater detail below with respect to FIG. 5, the power control module 220 may generate the portion plans 228, 230 based on the content delivery and exchange scheme 226, which specifies the overall operation of the power control module 220 with respect to distributing the content item 118 to the cellular devices 208, 210 according to one embodiment.

In one embodiment, the controller 202, in accordance with the content delivery and exchange scheme 226, instructs the cellular tower 206 to transmit the first content portion 222 to the first cellular device 208 and the second content portion 224 to the second cellular device 210. The controller 202 may further instruct the cellular tower to transmit the first portion plan 228 to the first cellular device 208 and the second portion plan 230 to the second cellular device 210. Upon receiving their respective content portions 222, 224 and the portion plans 228, 230, the first cellular device 208 and the second cellular device 210 initiate a third wireless link 218 in accordance with the portion plans 228, 230. Utilizing the third wireless link 218, the first cellular device 208 transmits the first content portion 222 to the second cellular device 210 in accordance with the first portion plan 228, and the second cellular device 210 transmits the second content portion 224 to the first cellular device 208 in accordance with the second portion plan 230.

Figure 4A:
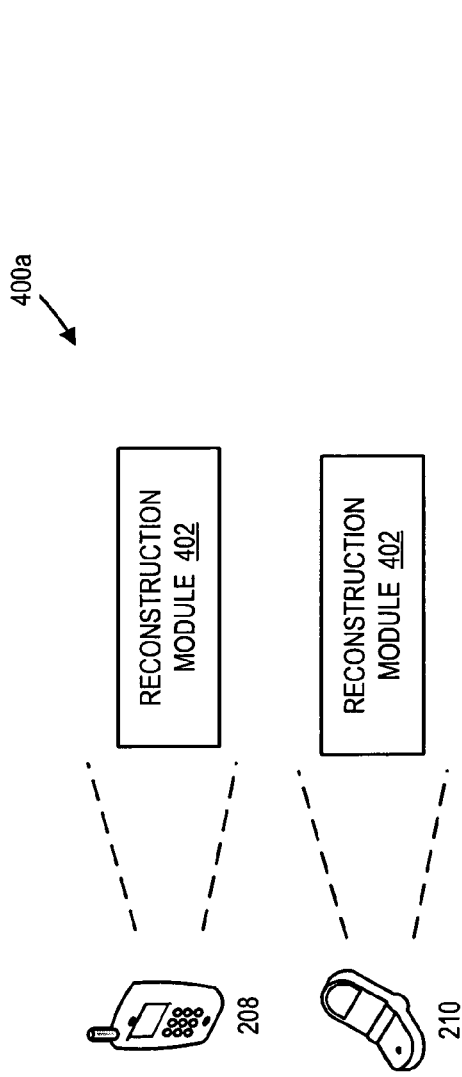
FIG. 4A is a block diagram illustrating cellular devices including a reconstruction module, in accordance with exemplary embodiments.
Figure 4B:
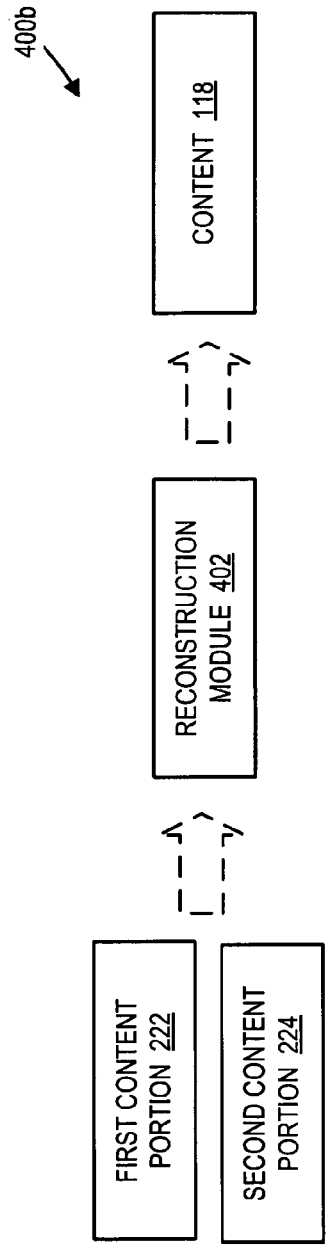
FIG. 4B is a block diagram illustrating an operation of the reconstruction module, in accordance with exemplary embodiments

Upon receiving both the first content portion 222 and the second content portion 224, the first cellular device 208 and the second cellular device 210 each reconstruct the content item 118 based on the first content portion 222 and the second content portion 224 according to the first portion plan 228 and the second portion plan 230, respectively. Turning now to FIG. 4A, the first cellular device 208 and the second cellular device 210 each include a reconstruction module 402. Turning now to FIG. 4B, in one embodiment, the reconstruction module 402 reconstructs the content item 118 based on the first content portion 222 and the second content portion 224 according to the portion plans 228, 230. While the content item 118 is being reconstructed, the first cellular device 208 and the second cellular device 210 may each display or otherwise play the content item 118 to their respective users. When the first content portion 222 and the second content portion 224 are received at slightly different times, the portion first received may be delayed or buffered or may be stored until needed, as is well-known in the art. In this way, the portion received may then be combined with the portion first received in a manner that properly aligns the multiple portions, thus allowing successful reconstruction of the content from which the multiple portions were derived.

In one embodiment, the power control module 220 and the reconstruction module 402 are configured such that the transmission of the content portions 222, 224 and reconstruction of the content item 118 based on the content portions 222, 224 occur at real-time or near real-time. In this way, the users of the cellular devices 208, 210 notice little or no impact in the operation of the power control module 220 and the reconstruction module 402 as compared to the conventional way of transmitting the content item 118 in its entirety to each of the cellular devices 108, 110. An exemplary approach for ensuring real-time or near real-time reconstruction of the content item 118 is to initiate the reconstruction after receiving only a part of the content portions 222, 224 from the other cellular devices 208, 210. The cellular devices 208, 210 can begin displaying or otherwise playing the content item 118 as it is being reconstructed. For example, the first cellular device 208 may begin reconstructing and displaying/playing the content item 118 after receiving a part of the second content portion 224 from the second cellular device 210. Similarly, the second cellular device 210 may begin reconstructing and displaying/playing the content item 118 after receiving a part of the first content portion 222 from the first cellular device 208.

Referring again to FIG. 2, by transmitting only the first content portion 222 to the first cellular device 208 and the second content portion 224 to the second cellular device 210, as opposed to transmitting the content item 118 in its entirety to both the first cellular device 208 and the second cellular device 210, the cellular tower 206 may experience a significant power savings. As illustrated in FIG. 2, the cellular tower 206 utilizes one hundred kpbs total (i.e., fifty kbps each) to transmit the first content portion 222 to the first cellular device 208 and the second content portion 224 to the second cellular device 210. This is a significant reduction in the two hundred kbps total (i.e., on hundred kbps each) of bandwidth utilized by the cellular tower 106 to transmit the content item 118 to both the first cellular device 108 and the second cellular device 110, as illustrated in FIG. 1. It should be appreciated that the bandwidth and power utilized to transmit the portion plans 228, 230 to the cellular devices 208, 210 is relatively negligible, depending on the required time period over which the portion plans 228, 230 are transmitted, given that the required bandwidth is inversely proportional to the time period in which a certain amount of data is required to be transferred.

Also as illustrated in FIG. 2, fifty kbps of bandwidth corresponds to a low or medium power signal. In particular, the cellular tower 106 utilizes a medium power signal to transmit the first content portion 222 to the first cellular device 208 and the second content portion 224 to the second cellular device 210. Further, the first cellular device 208 and the second cellular device 210 utilize two low power signals for transmissions across the third wireless link 218. The transmissions along the third wireless link 218 are generally short range (e.g., within a given proximity) and may be performed via a low power peer-to-peer communication protocol. As previously mentioned, examples of the communication protocol include, but are not limited to, TCP/IP, WiFi, WiMax, BlueTooth, GSM, CDMA, WAP, and HSPA.

According to an exemplary embodiment, one relatively low power signal is utilized for transmission from the first cellular device 208 to the second cellular device 210, and another relatively low power signal is utilized for transmission from the second cellular device 210 to the first cellular device 208. As used herein, the medium power signal corresponds to a power load on the cellular tower 106 that is less than the power load on the cellular tower 106 corresponding to the high power signal. Also as used herein, the low power signal corresponds to a power load on the cellular tower 106 that is less than the power load on the cellular tower 106 corresponding to the medium power signal. Under the cellular network configuration 200 of FIG. 2, the cellular tower 206 utilizes an amount of power corresponding to two medium power signals for transmitting at one hundred kbps total (i.e., fifty kbps to the first cellular device 208 and fifty kbps to the second cellular device 210). The power load on the cellular tower 206 corresponding to the two medium power signals, as illustrated in FIG. 2, is significantly less than the power load on the cellular tower 106 corresponding to two high power signals, as illustrated in FIG. 1. By distributing some of the bandwidth to the first cellular device 208 and the second cellular device 210, the cellular tower 206 is able to reduce its total power load and better ensure a higher QoS across the cellular network.

It should be appreciated that actual power levels may depend on the technology and parameters in use. In a simplified example, the actual power level may be considered to be roughly proportional to the data rate or bandwidth. In this way, halving the data rate or bandwidth may result in one half the power level, and conversely, doubling the data rate or bandwidth may result in twice the power level.

Although not so limited, the cellular network configuration 200 illustrates only two cellular devices 208, 210. It should be appreciated that the power control module 220 and the reconstruction module 402 may be utilized for any number of cellular devices. For example, if three cellular devices (not shown) within a given proximity request the content item 118 at about the same time, the power control module 220 may divide the content item 118 into three equally sized or near equally sized content portions. In this case, the cellular tower 206 transmits one of the three content portions, along with a corresponding portion plan, to each of three cellular devices. Upon receiving the content portion and the portion plan, each cellular device transmits its respective content portion to the two other cellular devices according to the portion plan. While the reconstruction module 402 reconstructs the content item 118 based on the three portions also according to the portion plan, the three cellular devices may each display or otherwise play the content item 118 to their respective users.

Although not so limited, the cellular network configuration 200 illustrates a single tier configuration of the cellular devices 208, 210. As used herein, a single tier configuration refers to a cellular network configuration where only a single layer of cellular devices, such as the cellular devices 208, 210, receives the content portions 222, 224 from the cellular tower 206. Also as used herein, a multiple tier configuration refers to a cellular network configuration where higher layers of cellular devices receive the content portions 222, 224 from lower layers of cellular devices. For example, if a third cellular device (not shown) is in secondary layer of cellular devices, then the third cellular device may receive a third portion plan (not shown) from the cellular tower 206. According to the third portion plan, the third cellular device may receive the first content portion 222 from the first cellular device 208 and the second content portion 224 from the second cellular device 210. Also according to the third portion plan, the third cellular device may reconstruct the content item 118 based on the first content portion 222 and the second content portion 224. It should be appreciated that the cellular network configuration 200 may include any suitable number of tiers, such as secondary tiers, tertiary tiers, quaternary tiers, and so forth.

It should further be appreciated that the power control module 220 and the reconstruction module 402 may utilize any suitable technique or protocol to divide and reconstruct the content item 118. For example, the MPEG protocol includes functionality suitable for dividing and reconstructing MPEG files.

Figure 5:
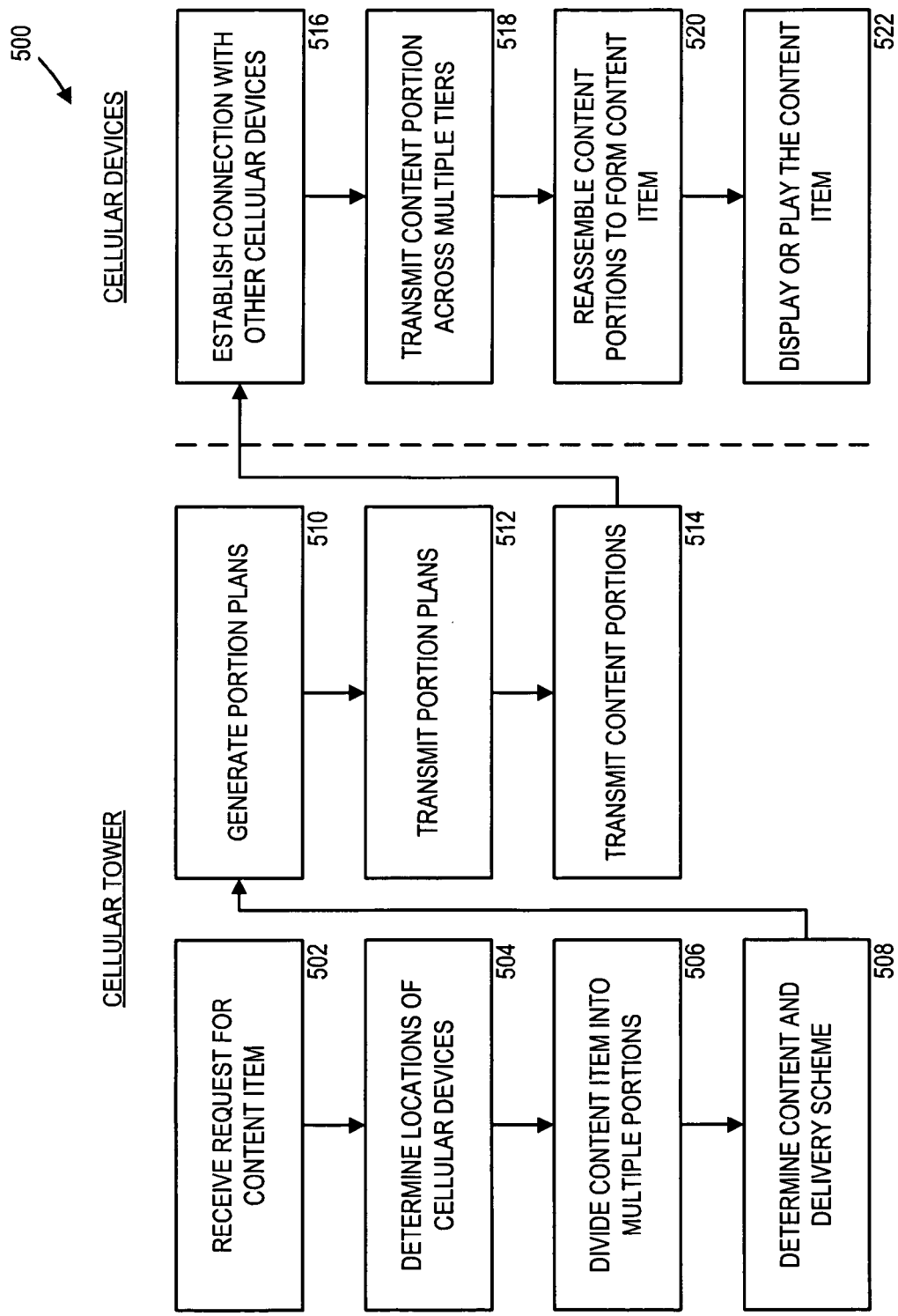
FIG. 5 is a flow diagram illustrating a method for reducing bandwidth when transmitting content to a cellular device, in accordance with exemplary embodiments.

FIG. 5 is a flow diagram illustrating a method 500 for reducing bandwidth when transmitting content to a cellular device, in accordance with exemplary embodiments. According to the method 500, the power control module 220 receives (at 502) requests for a content item, such as the content item 118, from two or more cellular devices, such as the first cellular device 208 and the second cellular device 210. For example, the content item 118 may be real-time or near real-time multimedia content, such as streaming video and audio. Upon receiving requests for the content item 118, the power control module 220 determines (at 504) the locations of the first cellular device 208 and the second cellular device 210. The locations of the first cellular device 208 and the second cellular device 210 may be determined by any suitable method, such as triangulation or a global positioning system ("GPS"). Other suitable geographic information, such as roads, obstacles, boundaries, and the like, may also be gathered via, for example, a geographic information system ("GIS").

The power control module 220 divides (at 506) the content item 118 into multiple portions. In one embodiment, the number of portions corresponds to the number of cellular devices requesting the content item 118. In the present example, since two cellular devices, i.e., the first cellular device 208 and the second cellular device 210, have requested the content item 118, the power control module 220 divides the content item 118 into two portions, i.e., the first content portion 222 and the second content portion 224. In one embodiment, each of the multiple portions, such as the first content portion 222 and the second content portion 224, are about the same size. Thus, if the content item 118 is about one gigabyte, then the first content portion 222 and the second content portion 224 are each about five hundred megabytes.

In more general terms, for a single tier situation, the number of portions may be determined by the number of cellular devices each receiving the same content. The size of each portion may be largely determined by any significant differences between one or more of the maximum available bandwidth, other relevant link conditions of the communication links, and/or channels between the tower and each of those cellular devices, with larger portions assigned to links of higher available bandwidth. Fine tuning of portion sizes may also be accomplished via obtaining information regarding differences in available bandwidth and/or other link conditions associated with the links directly between cellular devices. Examples of other potentially relevant link conditions may include, but are not limited to, noise levels, interference levels, fading, multi-path, and the like.

The power control module 220 also determines (at 508) a content delivery and exchange scheme 226. In one embodiment, the content delivery and exchange scheme 226 specifies the following: (1) which cellular devices 208, 210 receive which portions 222, 224 of the content item 118 from the cellular tower 206 and the controller 202; and (2) which cellular devices 208, 210 receive which portions 222, 224 of the content item 118 from other cellular devices 208, 210. The content delivery and exchange scheme 226 may be configured to provide an optimal reduction in bandwidth in relation to the distribution of the content item 118 to the cellular devices 208, 210. For example, the content delivery and exchange scheme 226 may be determined based on the locations of each of the cellular devices, the distance between the cellular devices (i.e., their proximity), and/or the signal strength of each of the cellular devices relative to the other cellular devices, and/or other potentially relevant link conditions such as those mentioned previously.

The cellular network configuration 200 of FIG. 2 illustrates a simple content delivery and exchange scheme 226 in which the power control module 220 transmits the first content portion 222 to the first cellular device 208 and the second content portion 224 to the second cellular device 210. Upon receiving the first content portion 222, the first cellular device 208 transmits the first content portion 222 to the second cellular device 210. Upon receiving the second content portion 224, the second cellular device 210 transmits the second content portion 224 to the first cellular device 208.

It should be appreciated that the content delivery and exchange scheme 226 may be more complex according to further embodiments. For example, the content delivery and exchange scheme 226 may define multiple tiers of cellular devices. In a first tier, the power control module 220 may transmit the first content portion 222 to the first cellular device 208 and the second content portion 224 to the second cellular device 210. The first cellular device 208 then transmits the first content portion 222 to the second cellular device 210, and the second cellular device 210 transmits the second content portion to the first cellular device 208. In a second tier, the first cellular device 208 and the second cellular device 210 may further transmit the first content portion 222 and the second content portion 224, respectively, to a third cellular device (not shown). The tiers may be based on the locations of each of the cellular devices, the distances between the cellular devices (i.e., their proximity), and/or the signal strength of each of the cellular devices relative to the other cellular devices. Examples of tiers may include primary cellular devices that receive content portions from the cellular tower 206, secondary cellular devices that receive the content portions from the primary cellular devices, tertiary cellular devices that receive the content portions from the second cellular devices, and so forth.

If an unusually large number of cellular devices request the content item 118, then the content delivery and exchange scheme 226 may become too complicated as a result of managing content portions and the transmission of these portions across so many different cellular devices. To reduce the complexity of the content delivery and exchange scheme 226, two or more cellular devices may be combined to form multiple groups of cellular devices. With the formation of groups, transmissions of content portions may be performed between groups of cellular devices instead of and/or in addition to individual cellular devices.

Due to the unpredictable nature of cellular networks, data transmitted from the cellular tower 206 to the cellular devices 208, 210 and between the cellular devices 208, 210 is sometimes lost, which potentially causes errors in the reconstruction of the content item 118. To reduce the potential for error, overlapping and redundant data may be transmitted from the cellular tower 206 to the cellular devices 208, 210 and between the cellular devices 208, 210. In one embodiment, the magnitude of the overlapping and redundant data may be dynamically adjusted by monitoring the changing conditions of the cellular network configuration 200. Error detection and correction ("EDAC") coding schemes may similarly be employed, as is well-known in the art.

Upon determining the content delivery and exchange scheme 226, the power control module 220 generates (at 510) a portion plan, such as the first portion plan 228 and the second portion plan 230, for each of the cellular devices 208, 210 requesting the content item 118 and in accordance with the content delivery and exchange scheme 226. In one embodiment, each of the portion plans 228, 230 is a set of instructions specifying, for the corresponding cellular device 208, 210, which of the content portions 222, 224 will be received, the source of the content portions 222, 224 (e.g., the cellular tower 206, one or more of the cellular devices 208, 210, a group of cellular devices), which of the content portions 222, 224 will be transmitted, and the destination of the content portions 222, 224 (e.g., one or more of the cellular devices 208, 210, a group of cellular devices). Upon generating the portion plans 228, 230 for the cellular devices 208, 210, the power control module 220 transmits (at 512) the respective portion plan 228, 230 to the cellular devices 208, 210. For example, as illustrated in FIG. 2, the power control module 220 may transmit the first portion plan 228 to the first cellular device 208 and the second portion plan 230 to the second cellular device 210. It should be appreciated that the content delivery and exchange scheme 226 and the portion plans 228, 230 may be modified over time in accordance with changing conditions. Generally, the portion plans are sent to the cellular devices 208, 210 separately from the content portions 222, 224, but it should be appreciated that these may be combined in various embodiments in any suitable fashion such that they may be appropriately separated for use.

The power control module 220 transmits (at 514) the respective content portions 222, 224 to each of the cellular devices 208, 210 in accordance with the content delivery and exchange scheme 226. For example, as illustrated in FIG. 2, the power control module 220 may transmit the first content portion 222 to the first cellular device 208 and the second content portion 224 to the second cellular device 210. In one embodiment, the power control module 220 transmits the content portions to only the primary tier of cellular devices.

Upon receiving their respective content portions 222, 224 from the power control module 220 and prior to the transmission of the content portions 222, 224 between the cellular devices 208, 210, the cellular devices 208, 210 establish (at 516) a connection via handshaking. Upon establishing the connection, each of the cellular devices 208, 210 transmits (at 518) its respective content portion 222, 224 to other cellular devices 208, 210 across multiple tiers according to the associated portion plan 228, 230. For example, the primary tier may transmit its content portion to other cellular devices in the primary tier, as well as cellular devices in the secondary tier. Further, the secondary tier of cellular devices may transmit the content portions to the tertiary tiers and so forth to other tiers of cellular devices. The transmissions between the cellular devices 208, 210 may be performed via a low power peer-to-peer communication protocol. As previously mentioned, examples of the communication protocol include, but are not limited to, TCP/IP, WiFi, WiMax, BlueTooth, GSM, CDMA, WAP, and HSPA.

Upon receiving all of the content portions 222, 224 as specified by the associated portion plan 228, 230, each of the cellular devices 208, 210 reassembles (at 520) the content item 118 based on the received content portions and according to the associated portion plan 228, 230. For example, the content item 118 may be reassembled utilizing the MPEG standard. Other suitable techniques for combining individual content portions into the content item 118 may be utilized as contemplated by those skilled in the art. Upon reassembling the content item 118, the cellular device (at 522) may display or otherwise play the content item 118 to the user. Although not so illustrated in FIG. 5, any errors during operations 504, 506, 508, 510, 512, 514, 516, 518, and 520 may cause the method 500 to revert back to operation 504. Errors may be determined based on any suitable threshold, such as a loss of a content portion, a corrupted content portion, a failure of a portion, and the like. It should be appreciated that use of multiple tiers may add delay, such as the delay associated with multiple levels of re-transmission and re-construction. Other delay may include delay associated with processing. In the case of delay, limits may be placed upon the number of tiers in a given situation such that acceptable delay times can be achieved.

Figure 6:
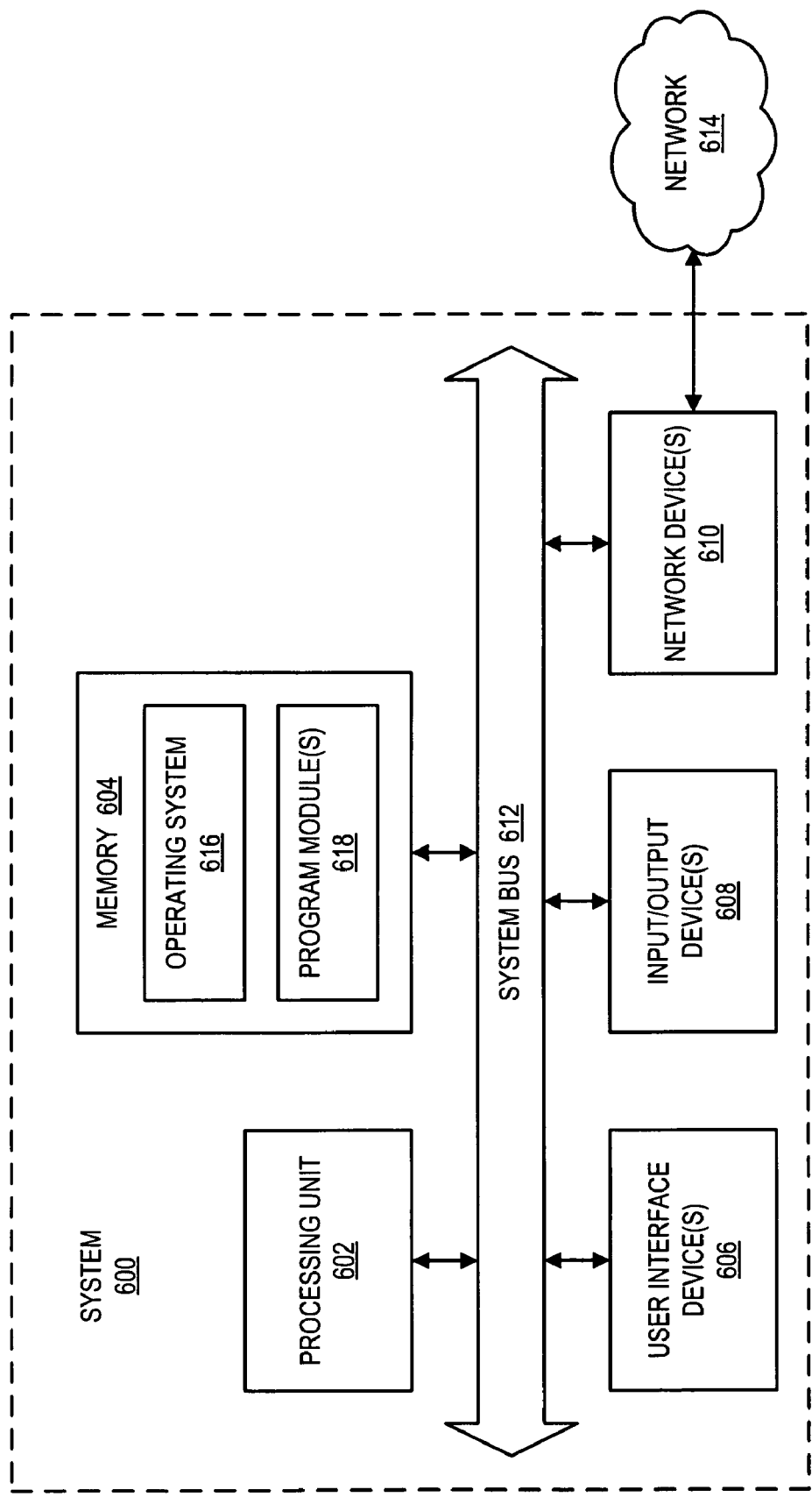
FIG. 6 is a block diagram illustrating a system configured to reduce bandwith when transmitting content to a cellular device, in accordance with exemplary embodiments.

FIG. 6 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 6 is a block diagram illustrating a computer system 600 configured to reduce bandwidth when transmitting content to a cellular device, in accordance with exemplary embodiments. Examples of the computer system 600 may include the cellular devices 208, 210 and the controller 202. The computer system 600 includes a processing unit 602, a memory 604, one or more user interface devices 606, one or more input/output ("I/O") devices 608, and one or more network devices 610, each of which is operatively connected to a system bus 612. The bus 612 enables bidirectional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 618 include the power control module 220, the content delivery and exchange scheme 226, the first portion plan 228, the second portion plan 230, and the reconstruction module 402. In one embodiment, the program modules 618 are embodied in computer-readable media containing instructions that, when executed by the processing unit 602, performs the method 500 for reducing bandwidth when transmitting content to a cellular device, as described in greater detail above with respect to FIG. 5.

According to further embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 614. Examples of the network 614 may include, but are not limited to, the backbone network 216 and the wireless links 212, 214, 218. Examples of the network devices 610 may include, but are not limited to, a modem, a radio frequency ("RF") or infrared ("IR") transceiver, a telephonic interface, a bridge, a router, or a network card. The network 614 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 614 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for reducing bandwidth when transmitting content to a cellular device, comprising:

receiving requests for a content item from a first cellular device and a second cellular device;

dividing the content item into a first portion and a second portion;

determining a first portion plan corresponding to the first cellular device and a second portion plan corresponding to the second cellular device, the first portion plan comprising instructions for transmitting the first portion from the first cellular device to the second cellular device and reconstructing the content item upon receiving at least part of the second portion from the second cellular device, the second portion plan comprising instructions for transmitting the second portion from the second cellular device to the first cellular device and reconstructing the content item upon receiving at least part of the first portion from the first cellular device;

transmitting the first portion and the first portion plan to the first cellular device;

transmitting the second portion and the second portion plan to the second cellular device;

determining whether the first cellular device is within a given proximity from the second cellular device for transmitting the second portion and the second portion plan to the second cellular device;

monitoring the proximity between the first cellular device and the second cellular device; and adjusting one of the first portion plan and the second portion plan based on changes to the proximity.

2. The method of claim 1, wherein dividing the content item into a first portion and a second portion comprises upon determining that the first cellular is within the given proximity from the second cellular device, dividing the content item into the first portion and the second portion.

3. The method of claim 1, wherein transmitting the first portion and the first portion plan to the first cellular device comprises transmitting redundant parts of the first portion and the first portion plan to the first cellular device, and wherein transmitting the first portion and the first portion plan to the first cellular device comprises transmitting a corresponding error detection and correction code associated with the first portion and the first portion plan to the first cellular device.

4. The method of claim 1, further comprising transmitting a third portion plan to a third cellular device, the third portion plan comprising instructions for reconstructing the content item upon receiving at least part of the first portion from the first cellular device and at least part of the second portion from the second cellular device, wherein the first portion plan further comprises instructions for transmitting the first portion from the first cellular device to the third cellular device, and wherein the second portion plan further comprises instructions for transmitting the second portion from the second cellular device to the third cellular device.

5. The method of claim 1, wherein receiving requests for a content item from a first cellular device and a second cellular device comprises receiving requests for the content item from the first cellular device and the second cellular device at about a same time.

6. A system for reducing bandwidth when transmitting content to a cellular device, comprising:

a memory for storing a program containing code for reducing bandwidth when transmitting content to the cellular device;

a processor functionally coupled to the memory, the processor being responsive to computer-executable instructions contained in the program and operative to at least receive requests for a content item from a first cellular device and a second cellular device, divide the content item into a first portion and a second portion, determine a first portion plan corresponding to the first cellular device and a second portion plan corresponding to the second cellular device, the first portion plan comprising instructions for transmitting the first portion from the first cellular device to the second cellular device and reconstructing the content item upon receiving at least part of the second portion from the second cellular device, the second portion plan comprising instructions for transmitting the second portion from the second cellular device to the first cellular device and reconstructing the content item upon receiving at least part of the first portion from the first cellular device, transmit the first portion and the first portion plan to the first cellular device, transmit the second portion and the second portion plan to the second cellular device, determine whether the first cellular device is within a given proximity from the second cellular device for transmitting the second portion and the second portion plan to the second cellular device, monitor the proximity between the first cellular device and the second cellular device, and adjust one of the first portion plan and the second portion plan based on changes to the proximity.

7. The system of claim 6, wherein to divide the content item into a first portion and a second portion, the processor is further operative to at least upon determining that the first cellular is within the given proximity from the second cellular device, divide the content item into the first portion and the second portion.

8. The system of claim 6, wherein to transmit the first portion and the first portion plan to the first cellular device, the processor is further operative to at least transmit redundant parts of the first portion and the first portion plan to the first cellular device, and wherein to transmit the first portion and the first portion plan to the first cellular device, the processor is further operative to at least transmit a corresponding error detection and correction code associated with the first portion and the first portion plan to the first cellular device.

9. The system of claim 6, the processor being further operative to at least transmit a third portion plan to a third cellular device, the third portion plan comprising instructions for reconstructing the content item upon receiving at least part of the first portion from the first cellular device and at least part of the second portion from the second cellular device, wherein the first portion plan further comprises instructions for transmitting the first portion from the first cellular device to the third cellular device, and wherein the second portion plan further comprises instructions for transmitting the second portion from the second cellular device to the third cellular device.

10. A non-transitory computer-readable medium having instructions stored thereon for execution by a processor to provide a method for reducing bandwidth when transmitting content to a cellular device, the method comprising:

receiving requests for a content item from a first cellular device and a second cellular device;

dividing the content item into a first portion and a second portion;

determining a first portion plan corresponding to the first cellular device and a second portion plan corresponding to the second cellular device, the first portion plan comprising instructions for transmitting the first portion from the first cellular device to the second cellular device and reconstructing the content item upon receiving at least part of the second portion from the second cellular device, the second portion plan comprising instructions for transmitting the second portion from the second cellular device to the first cellular device and reconstructing the content item upon receiving at least part of the first portion from the first cellular device;

transmitting the first portion and the first portion plan to the first cellular device;

transmitting the second portion and the second portion plan to the second cellular device;

determining whether the first cellular device is within a given proximity from the second cellular device for transmitting the second portion and the second portion plan to the second cellular device;

monitoring the proximity between the first cellular device and the second cellular device; and adjusting one of the first portion plan and the second portion plan based on changes to the proximity.

11. The non-transitory computer-readable medium of claim 10, wherein dividing the content item into a first portion and a second portion comprises upon determining that the first cellular is within the given proximity from the second cellular device, dividing the content item into the first portion and the second portion.

12. The non-transitory computer-readable medium of claim 10, wherein transmitting the first portion and the first portion plan to the first cellular device comprises transmitting redundant parts of the first portion and the first portion plan to the first cellular device, and wherein transmitting the first portion and the first portion plan to the first cellular device comprises transmitting a corresponding error detection and correction code associated with the first portion and the first portion plan to the first cellular device.

13. The non-transitory computer-readable medium of claim 10, the method further comprising transmitting a third portion plan to a third cellular device, the third portion plan comprising instructions for reconstructing the content item upon receiving at least part of the first portion from the first cellular device and at least part of the second portion from the second cellular device, wherein the first portion plan further comprises instructions for transmitting the first portion from the first cellular device to the third cellular device, and wherein the second portion plan further comprises instructions for transmitting the second portion from the second cellular device to the third cellular device.

14. The non-transitory computer-readable medium of claim 10, wherein receiving requests for a content item from a first cellular device and a second cellular device comprises receiving requests for a content item from a first cellular device and a second cellular device at about a same time.

* * * * *